Aug. 9, 1966  R. B. JOHNSON  3,265,320

FLEXIBLE THREADING GUIDE

Filed May 14, 1964

ROBERT B. JOHNSON
INVENTOR.

BY R. Frank Smith
David P. Ogden
ATTORNEYS

United States Patent Office 3,265,320
Patented August 9, 1966

3,265,320
FLEXIBLE THREADING GUIDE
Robert B. Johnson, Rochester, N.Y., assignor to Eastman Kodak Company, Rochester N.Y., a corporation of New Jersey
Filed May 14, 1964, Ser. No. 367,379
7 Claims. (Cl. 242—76)

The present invention relates to a flexible threading guide and more particularly to a flexible guide useful for directing a film during an automatic threading process.

In the art of automatic threading of various machines and particularly film projectors, various threading arrangements are known in the prior art, such as the use of channels or tubes through which the film is directed over sprocket wheels and rollers of various sorts. However, a problem exists because of the necessity of providing dancing rollers and the like to compensate for intermittent movement of the film itself. Since these dancing rollers must be movable to function in their normal manner, a guide means for directing the end of a film past such rollers requires special considerations. Because of this problem, a few of the automatic threading arrangements have either omitted dancing rollers and their function, or have been forced to place the dancing rollers outside of the self-threading portion of the machine. Obviously, there is a present need for an arrangement which will allow self-threading of the end of a film past the dancing roller.

Therefore, an object of the present invention is to provide a new and reliable flexible threading guide usable to guide the leading end of a film over a dancing roller without restricting the normal work function of the roller.

In accordance with one embodiment of my invention, a dancing roller is mounted on a snubber spring having a normal work function allowing the dancing roller to approach a spaced-apart guide roller. Because of the spacing between the guide roller and the dancing roller in the relaxed position, the leading end of a film being threaded thereby tends to pass between the rollers rather than around the outer surface of both. This is particularly true when the film leader tends to be curly as occurs after being stored for some time. To prevent such misthreading, a thin plastic threading guide is coupled around the rollers so that the film leader may not pass therebetween. Moreover, this guide is flexible enough so that it does not materially alter the snubbing characteristics of the snubber spring.

The subject matter which is regarded as my invention is particularly pointed out and distinctly claimed in the concluding portion of this specification. The invention, however, as to its organization and operation together with further objects and advantages thereof, will best be understood by reference to the following description taken in connection with the accompanying drawing, in which:

Figure 1:
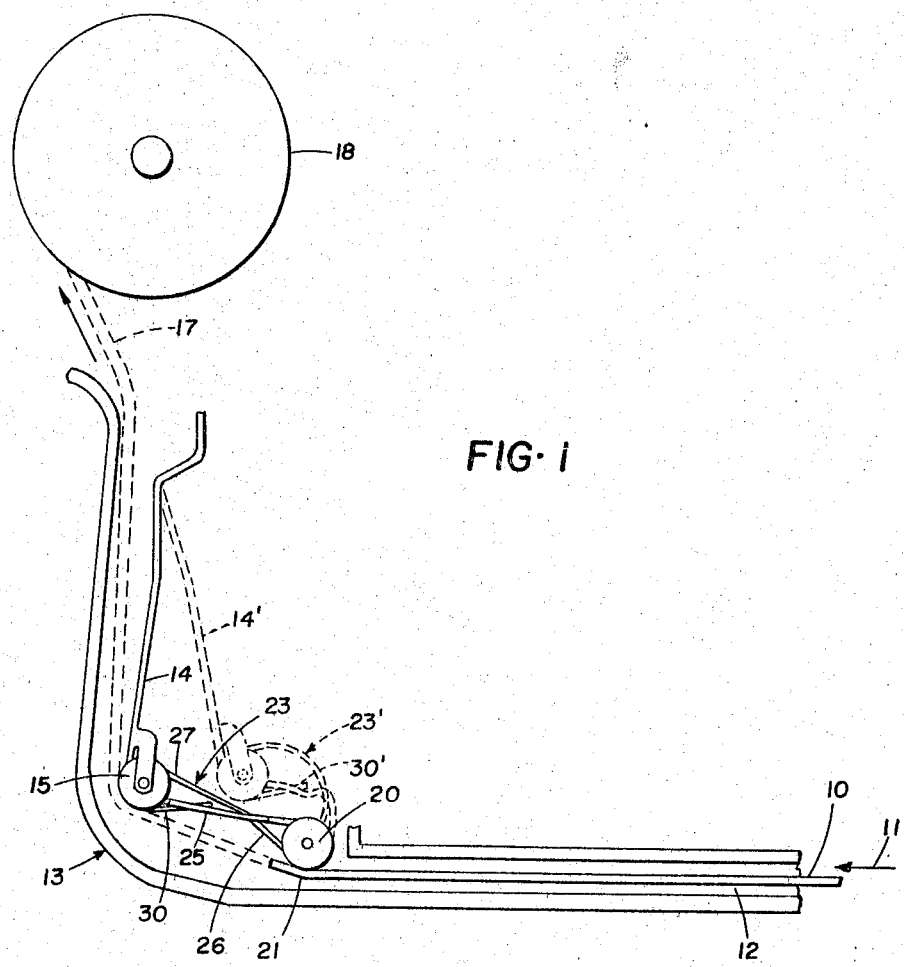
FIG. 1 is a cutaway perspective view illustrating the use of my invention.

Referring now to the drawing, in which like numbers refer to similar parts, I have shown in FIG. 1 a filmstrip 10 being pushed, as indicated by an arrow 11, through a channel 12 toward an elbow region 13 containing a snubber spring 14 having a low friction guide means illustrated as a dancing roller 15 on the end thereof. As indicated by dashed lines 17, threading is completed when the filmstrip 10 is pushed to the region of a take-up reel 18.

However, the spacing between the dancing roller 15 and a low friction guide means such as another roller 20 is sufficient so that the leading end 21 of the film 10 will sometimes tend to pass between the rollers 15 and 20. In a self-threading motion picture projector the filmstrip will soon become tangled and damaged if allowed to enter under or behind its proper threaded path. Such misthreading is further enhanced because of the upward curvature of the filmstrip resulting from the storage of the filmstrip on a supply reel. According to my invention, this travel of the leading end 21 is prevented by a flexible threading guide 23.

Figure 2:
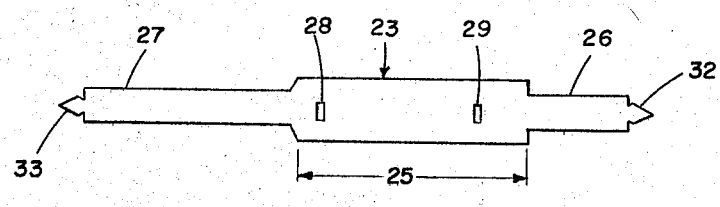
FIG. 2 is a plan view of the plastic threading guide in a flattened position.

As shown more clearly in FIG. 2, the threading guide 23 consists of a strap-like plastic member having a main body section 25 and two less rigid portions or tails 26 and 27. In the main body portion there are provided two apertures, 28 and 29. The aperture 28 is adapted to be engaged by a guide toe 30 of the snubber spring 14 whereby the main portion 25 is deflected substantially horizontally when the snubber spring 14 is in the relaxed position. The aperture 29 is adapted to receive the ends of the tails 26 and 27 respectively as indicated in FIG. 1. These ends 32 and 33 are provided with a locking configuration so that they will remain in the aperture 29 once placed therein.

Because of the greater thickness of the main body portion 25, it is substantially more rigid than the tail portions 26 and 27. As a result, when the snubber spring 14 is moved to the position indicated at 14' (in phantom), the flexible guide 23 will reside in the position above the guide roller 20 indicated at 23'. As indicated at 30' the toe 30 assures the flexible guide 23' movement away from the filmstrip 10 when the snubber spring 14 is moved to the position 14'. Thus, except during the threading operation, the filmstrip 10 will not touch or be touched by the flexible guide 23 whereby the possibility of abrasion damage thereby is substantially eliminated.

While I have shown and described particular embodiments of the present invention, other modifications may occur to those skilled in this art. I intend, therefore, to have the appended claims cover all modifications which fall within the true spirit and scope of my invention.

I claim:
1. Threading means for guiding a filmstrip comprising:
    a dancing roller;
    a snubber spring for movably supporting said dancing roller and arranged to be deflected in response to tension in the threaded filmstrip;
    guide means spaced apart from said spring and receptive of the filmstrip;
    a flexible guide strip coupled between said spring and said guide means to prevent the filmstrip passing therebetween instead of therearound during threading; and
    diverting means associated with said snubber spring for deflecting said guide strip away from the filmstrip when said snubber spring is deflected by tension in the filmstrip.

2. Threading means as in claim 1 wherein said guide means is a roller located upstream of said snubber spring, and said guide strip is fabricated with a relatively stiff central portion secured to said snubber spring to be responsive to movement thereof.

3. Threading means as in claim 2 wherein said guide strip is a flexible strap member having tail portions circumscribing each of said rollers and a main body portion coupled to said diverting means.

4. Threading means for guiding a filmstrip, comprising:
    a dancing roller;
    a snubber spring for movably supporting the dancing roller and arranged to be deflected in response to tension in the filmstrip when threaded;

a guide roller spaced apart from said spring and receptive of the filmstrip; and a flexible guide strip coupled to prevent passage of the filmstrip between the dancing roller and said guide roller thereby to direct the filmstrip around these rollers during threading.

5. Threading means as in claim 4 wherein said flexible guide strip is supported solely by said snubber spring and said guide roller.

6. Threading means as in claim 5 wherein said flexible guide is looped around said guide roller and the dancing roller supported on said snubber spring.

7. Threading means as in claim 6 wherein said snubber spring is provided with a toe portion which engages the loop of said flexible guide around the dancing roller to deflect said guide away from the filmstrip when said snubber spring is deflected.

References Cited by the Examiner

UNITED STATES PATENTS 2,800,832   7/1957   Hintz et al. _____ 352—158

MERVIN STEIN, *Primary Examiner.*

STANLEY N. GILREATH, *Examiner.*

W. S. BURDEN, *Assistant Examiner.*